No. 777,323. Patented December 13, 1904.

UNITED STATES PATENT OFFICE.

JULIUS ABEL, OF MANNHEIM, AND ARTHUR LÜTTRINGHAUS, OF LUDWIGSHAFEN-ON-THE-RHINE, GERMANY, ASSIGNORS TO THE BADISCHE ANILIN UND SODA FABRIK, OF LUDWIGSHAFEN-ON-THE-RHINE, GERMANY, A CORPORATION OF BADEN.

BLUE DYE AND PROCESS OF MAKING SAME.

SPECIFICATION forming part of Letters Patent No. 777,323, dated December 13, 1904.

Application filed October 24, 1902. Serial No. 128,615. (Specimens.)

*To all whom it may concern:*

Be it known that we, JULIUS ABEL, doctor of philosophy and chemist, a citizen of the free Hansa town of Hamburg, residing at Mannheim, in the Grand Duchy of Baden, and ARTHUR LÜTTRINGHAUS, doctor of philosophy and chemist, a subject of the King of Prussia, Emperor of Germany, residing at Ludwigshafen-on-the-Rhine, in the Kingdom of Bavaria, Empire of Germany, have invented new and useful Improvements in Blue Coloring-Matter and Processes of Producing Same, of which the following is a specification.

This invention relates to substantive blue coloring-matters containing sulfur, which coloring-matters directly dye cotton from a bath containing sodium sulfid.

We first suitably treat methylene-violet or an analogue thereof with sulfur chlorid—for instance, that represented by the formula $S_2Cl_2$. A coloring-matter hereby results which directly dyes cotton blue or blue-violet shades from a bath containing sodium sulfid. We then further treat this blue-violet coloring-matter with sulfur and alkali sulfid, whereby coloring-matter is obtained which directly dyes cotton from a bath containing sodium sulfid shades of blue which are less red than those aforementioned.

Hereinafter we employ the term "methylene-violet body" to include not only methylene-violet itself, but also its analogues.

We illustrate methods of carrying out our invention by the following examples (the parts are by weight:)

Example 1: Dissolve during about two (2) hours and at a temperature of about ten degrees centigrade (10° C.) one hundred (100) parts of methylene-violet in seven hundred (700) parts of fuming sulfuric acid, containing twenty-three (23) per cent. free $SO_3$. Then add to the mixture one hundred (100) parts of sulfur chlorid ($S_2Cl_2$) and warm the whole, while stirring, to a temperature of about from thirty to thirty-five degrees centigrade, (30°–35° C.) Maintain this temperature until a test portion of the melt on being diluted with water neutralized with soda and shaken out with chloroform imparts a violet-blue color to the latter without showing any brown-red fluorescence, which fluorescence would be due to the presence of unaltered methylene-violet. On reaching this stage pour the melt onto about four thousand (4,000) parts of ice, add ammonia until the liquid shows a faint alkaline reaction, drain on the pump the coloring-matter which separates out, and wash it well with water and press and dry it at ordinary temperature. The coloring-matter so obtained is difficultly soluble in chloroform with a blue to blue-violet color without fluorescence. It dissolves in concentrated hydrochloric acid, yielding a pure blue-colored solution.

Example 2: Into one hundred (100) parts of crystallized sodium sulfid contained in a vessel heated, by means of an oil-bath, to about one hundred degrees centigrade (100° C.) introduce thirty (30) parts of the coloring-matter, such as can be obtained according to the foregoing Example 1. When solution of the coloring-matter has been effected, add thirty (30) parts of sulfur to the mixture. Dry the mass by gradually raising the temperature of the oil-bath to about one hundred and seventy degrees centigrade, (170° C.) The mass can then, if desired, be directly used for dyeing. It is preferred, however, to dissolve it in about fifteen hundred (1,500) parts of hot water and after filtering to precipitate the coloring-matter (mixed with sulfur) from this solution by blowing air through it. The coloring-matter so obtained is practically insoluble in chloroform and concentrated hydrochloric acid.

Example 3: Into one hundred and twenty (120) parts of molten cystallized sodium sulfid heated to about one hundred degrees centigrade (100° C.) and contained in a reflux apparatus introduce forty (40) parts of the coloring-matter, such as can be obtained according to the foregoing Example 1. Then add to the greenish-yellow solution twenty (20) parts of sulfur and boil and stir the whole for from two to four hours (2-4) or until the initial material has been completely or almost completely converted. When practically no further decrease in the quantity of initial coloring-matter present occurs on shaking out a test portion of the melt after oxidizing with chloroform, the operation is interrupted.

To isolate the new coloring-matter, dilute the melt with from fifteen hundred to two thousand (1,500-2,000) parts of boiling water and filter the diluted melt from any undissolved matter which may be present and blow air through the filtrate. The new coloring-matter mixed with sulfur is thereby precipitated and can be collected in the usual manner.

We claim—

1. The process of manufacturing bluish substantive coloring-matter by treating a methylene-violet body, with sulfur chlorid and then subjecting the resulting product to the action of sulfur and alkali sulfid.

2. The process of manufacturing bluish to violet-bluish substantive coloring-matter by treating a methylene-violet body, with sulfur chlorid.

3. Coloring-matter which can be obtained from a methylene-violet body and sulfur chlorid, which dyes unmordanted cotton from a bath containing sodium sulfid shades which lie within the range of blue to blue-violet, and which coloring-matter is difficultly soluble in chloroform yielding a blue to blue-violet color and gives a blue-colored solution with concentrated hydrochloric acid.

4. Coloring-matter which can be obtained from a methylene-violet body, sulfur chlorid, sodium sulfid and sulfur, which dyes unmordanted cotton from a bath containing sodium sulfid shades which lie within the range of blue to blue-violet and which coloring-matter is practically insoluble in chloroform and in concentrated hydrochloric acid.

In testimony whereof we have hereunto set our hands in the presence of two subscribing witnesses.

JULIUS ABEL.
ARTHUR LÜTTRINGHAUS.

Witnesses:
ERNEST F. EHRHARDT,
JACOB ADRIAN.